US012747541B2

(12) United States Patent
Mizutani et al.

(10) Patent No.: US 12,747,541 B2
(45) Date of Patent: Sep. 29, 2026

(54) RAIL CONNECTING STRUCTURE

(71) Applicant: THK CO., LTD., Tokyo (JP)

(72) Inventors: Yuichi Mizutani, Tokyo (JP); Kazutoshi Harima, Tokyo (JP); Marina Takeda, Tokyo (JP); Akira Ishihara, Tokyo (JP); Yusuke Asano, Tokyo (JP)

(73) Assignee: THK CO., LTD., Tokyo (JP)

( * ) Notice: Subject to any disclaimer, the term of this patent is extended or adjusted under 35 U.S.C. 154(b) by 140 days.

(21) Appl. No.: 18/838,440

(22) PCT Filed: Jan. 19, 2023

(86) PCT No.: PCT/JP2023/001464

§ 371 (c)(1),
(2) Date: Aug. 14, 2024

(87) PCT Pub. No.: WO2023/157546

PCT Pub. Date: Aug. 24, 2023

(65) Prior Publication Data

US 2025/0154730 A1 May 15, 2025

(30) Foreign Application Priority Data

Feb. 15, 2022 (JP) ................................ 2022-020928

(51) Int. Cl.
*E01B 5/02* (2006.01)
*E01B 25/30* (2006.01)
(Continued)

(52) U.S. Cl.
CPC ................ *E01B 5/02* (2013.01); *E01B 25/30* (2013.01); *E01B 25/305* (2013.01); (Continued)

(58) Field of Classification Search
CPC .......... E01B 5/02; E01B 25/305; E01B 25/30; B65G 54/02; B65G 2812/99; F16C 29/005
See application file for complete search history.

(56) References Cited

U.S. PATENT DOCUMENTS

2012/0085833 A1* 4/2012 Katayama .............. B61B 13/08 238/151
2020/0010287 A1 1/2020 Urata et al.
(Continued)

FOREIGN PATENT DOCUMENTS

CN 110520571 A 11/2019
CN 213538566 U 6/2021
(Continued)

OTHER PUBLICATIONS

International Search Report dated Mar. 20, 2023, issued in counterpart International Application No. PCT/JP2023/001464. (2 pages).
(Continued)

*Primary Examiner* — Cheng Lin
(74) *Attorney, Agent, or Firm* — WHDA, LLP

(57) ABSTRACT

A rail connecting structure is provided which can absorb misalignment occurring on rail mounting members side and reduce a level difference generated at a connecting portion of rails. A rail connecting structure that connects rails (6, 7) to be mounted on rail mounting members (4, 5) includes a base block (22) that is placed at a connecting portion (14) of one rail (6) and the other rail (7) and is separate from the rail mounting members (4, 5), in which the base block (22) is fastened to the one rail (6) and the other rail (7) with fastening members that are passed through mounting holes (6*a*, 7*a*) of the one rail (6) and the other rail (7), and the base block (22) is not fixed to the rail mounting members (4, 5), and is movable relative to the rail mounting members (4, 5).

11 Claims, 8 Drawing Sheets

(51) Int. Cl.
*F16C 29/00* (2006.01)
*B65G 54/02* (2006.01)

(52) U.S. Cl.
CPC ............ *F16C 29/005* (2013.01); *B65G 54/02* (2013.01); *B65G 2812/99* (2013.01)

(56) References Cited

U.S. PATENT DOCUMENTS

| | | | | |
|---|---|---|---|---|
| 2020/0270818 | A1 | 8/2020 | Karpala | |
| 2021/0032039 | A1 * | 2/2021 | Hogan .................. | B65G 54/02 |

FOREIGN PATENT DOCUMENTS

| | | | | |
|---|---|---|---|---|
| CN | 214245150 | U | 9/2021 | |
| DE | 102016107139 | B4 * | 11/2017 | .......... F16C 29/0657 |
| EP | 3771665 | A1 * | 2/2021 | ............. B65G 54/02 |
| JP | 63-75202 | A | 4/1988 | |
| JP | 2000-312463 | A | 11/2000 | |
| JP | 2003283160 | A * | 10/2003 | |
| JP | 2010-265627 | A | 11/2010 | |
| JP | 2012100512 | A * | 5/2012 | ............. B61B 13/08 |
| JP | 5567459 | B2 * | 8/2014 | ............. B61B 13/08 |
| WO | 2018/055708 | A1 | 3/2018 | |

OTHER PUBLICATIONS

Office Action dated Feb. 4, 2026, issued in counterpart CN Application No. 202380018903.X, with partial English translation.(10 pages).

* cited by examiner

RAIL CONNECTING STRUCTURE

TECHNICAL FIELD

The present invention relates to a rail connecting structure that connects rails to be mounted on rail mounting members.

BACKGROUND ART

Conventionally, when connecting two or more rails, a common method is to provide two reference surfaces (surfaces against which bottom surfaces and side surfaces of the rails abut) on a rail mounting member side, press the two rails against the reference surfaces with a strong force by use of a vise and bolts, and fix the rails without misalignment therebetween. This is because the generation of a level difference at a connecting portion of the rails causes adverse effects on the movement and life of a carriage that moves along the rails. However, this method is based on the premise that the two reference surfaces are formed on one integrated component and there is no mutual error between the reference surfaces against which one rail and the other rail abut.

On the other hand, in a case of constructing a long path, or in a case of such a product in which rails and rail mounting members are modularized as represented by a linear transport system, not only the rails but also the rail mounting members are separated (refer to Patent Literature 1).

CITATION LIST

Patent Literature

Patent Literature 1: JP S63-75202 A

SUMMARY OF INVENTION

Technical Problem

However, when the rail mounting members are separated, the rail mounting members are misaligned at a connecting portion thereof, and thus in the above rail mounting method, a level difference is generated at the connecting portion of the rails that are mounted on the rail mounting members. Even if the rail mounting members are not separated, a level difference is similarly generated at the connecting portion of the rails when mutual error occurs between the reference surfaces of the rail mounting members against which the two rails abut.

The present invention has been made in view of the above problems, and an object of the present invention is to provide a rail connecting structure capable of absorbing misalignment occurring on rail mounting members side and reducing a level difference generated at a connecting portion of rails.

Solution to Problem

In order to solve the above problems, one aspect of the present invention is a rail connecting structure that connects rails to be mounted on rail mounting members, the rail connecting structure including a base block that is placed at a connecting portion of one rail and the other rail and is separate from the rail mounting members, in which the base block is fastened to the one rail and the other rail with fastening members that are passed through mounting holes of the one rail and the other rail, and the base block is not fixed to the rail mounting members and is movable relative to the rail mounting members.

Advantageous Effects of Invention

According to the present invention, it is possible to absorb misalignment occurring on rail mounting members side and reduce a level difference generated at a connecting portion of rails.

DESCRIPTION OF EMBODIMENTS

A rail connecting structure according to an embodiment of the present invention is described in detail hereinafter with reference to the accompanying drawings. However, the rail connecting structure of the present invention can be embodied in various forms and is not limited to the embodiment described in the present description. The present embodiment is provided with the intention of enabling those skilled in the art to fully understand the invention by fully disclosing the description.

(Linear Motor)

Figure 1:
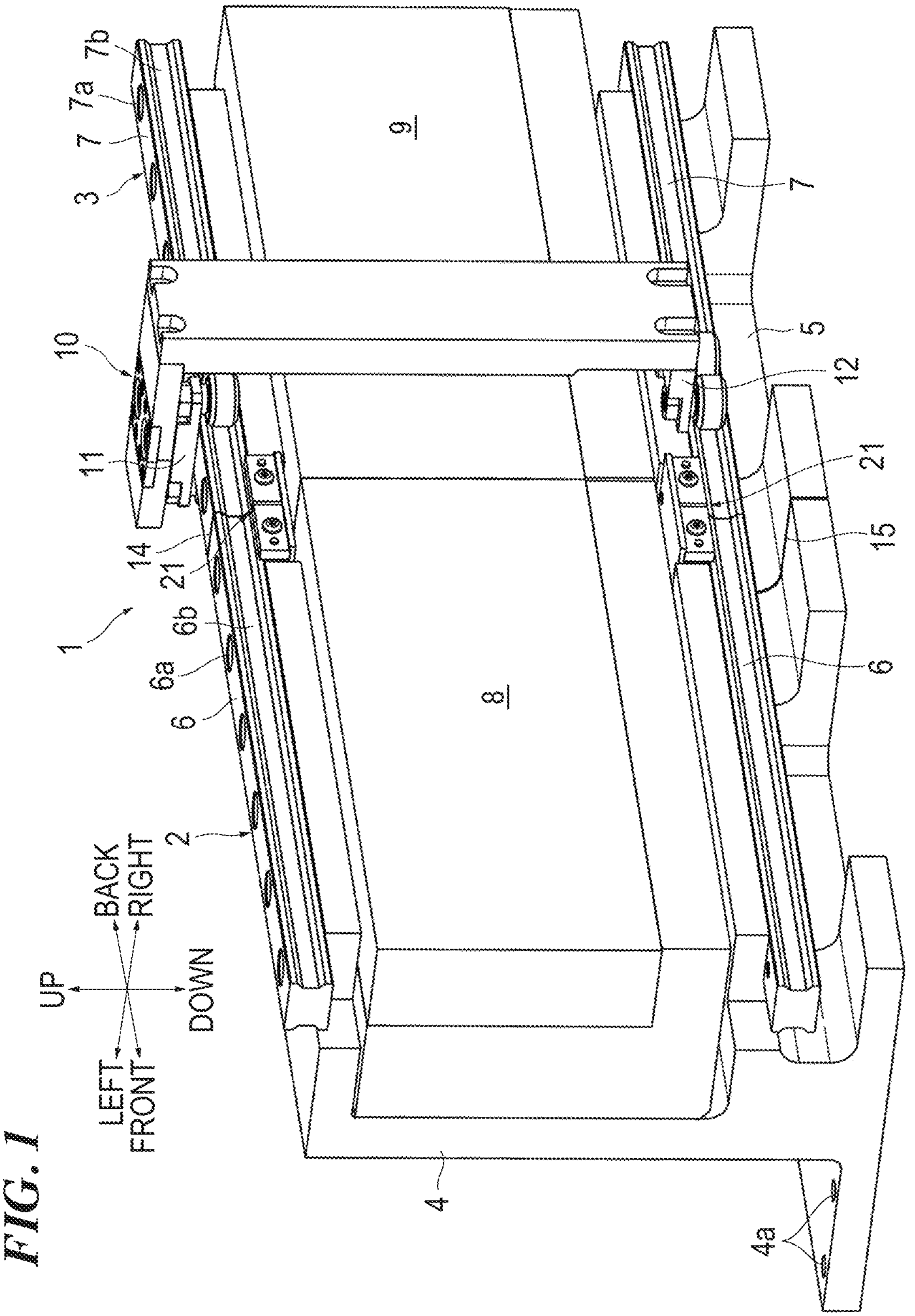
FIG. 1 is a perspective view of a linear motor to which a rail connecting structure of the present embodiment is applied.

FIG. 1 illustrates a linear motor 1 to which the rail connecting structure of the present embodiment is applied. The linear motor 1 is configured by joining two or more modules 2 and 3. The modules 2 and 3 are each complete in one unit of module, and include rail mounting members 4 and 5, rails 6 and 7, and stators 8 and 9 (for example, coils) of the linear motor. By joining the two or more modules 2 and 3, two or more of each of components thereof can be joined, and the long linear motor 1 can be constructed.

A reference sign 10 denotes a carriage that travels along the rails 6 and 7. Movers (for example, magnets, not illustrated) facing the stators 8 and 9 are mounted on the carriage 10. The thrust of the linear motor 1 acts on the carriage 10. Traveling bodies 11 and 12 are provided to upper and lower parts of the carriage 10. The traveling bodies 11 and 12 include rollers sandwiching the rails 6 and 7. Instead of the traveling bodies 11 and 12, a moving block of a linear guide may be used.

(Rail Connecting Structure)

A rail connecting structure 21 of the present embodiment is described. Since the roller of the traveling body 11 travels, or a rolling element of the moving block rolls, the rails 6 and 7 are precision components. On the other hand, the rail mounting members 4 and 5 are not as high precision components as the rails 6 and 7. Even if the rail mounting members 4 and 5 are connected together with care by use of, for example, a positioning pin and a connecting plate in which the positioning pin fits, misalignment occurs between the rail mounting members 4 and 5. Hence, when the rails 6 and 7 are simply mounted on the rail mounting members 4 and 5, a level difference is generated also at a connecting portion 14 of the rails 6 and 7. The rail connecting structure 21 of the present embodiment has a role of absorbing the misalignment occurring on the rail mounting members 4 and 5 side and reducing the level difference generated at the connecting portion 14 of the rails 6 and 7.

Note that hereinafter, for convenience of description, directions as viewed in a longitudinal direction with the rails 6 and 7 placed on a horizontal plane, that is, directions of up, down, left, right, front, and back illustrated in FIG. 1, are used when the upper rail connecting structure 21 is described. Naturally, the placement of the rail connecting structure 21 is not limited thereto. Note that the lower rail connecting structure 21 is obtained by flipping the upper rail connecting structure 21 vertically. Therefore, the same reference signs are assigned thereto, and a description thereof is omitted. Moreover, in the linear motor 1, the modules 2 and 3 are provided with a pair of the upper and lower rails 6 and a pair of the upper and lower rails 7, respectively, but each of the modules 2 and 3 may be provided with one rail.

The rail mounting members 4 and 5 are frames. The rail mounting members 4 and 5 are fastened to a base such as a floor, a surface plate, or a trestle with fastening members such as bolts. A reference surface against which the rail mounting members 4 and 5 abut is formed on the base to which the rail mounting members 4 and 5 are fastened. The rail mounting members 4 and 5 are formed with mounting holes 4*a* through which the fastening members pass. The rail mounting member 4 and the rail mounting member 5 are connected together by use of, for example, a positioning pin and a connecting plate. Note that the positioning pin and the connecting plate may be omitted.

The rails 6 and 7 are mounted on the rail mounting members 4 and 5. A connecting portion 15 of the rail mounting members 4 and 5 and the connecting portion 14 of the rails 6 and 7 are at substantially the same position, but may be misaligned. Mounting holes 6*a* and 7*a* such as counterbores through which fastening members are passed are formed in top surfaces of the rails 6 and 7. Rolling surfaces 6*b* and 7*b* on which the rollers of the traveling bodies 11 and 12 roll are formed on side surfaces of the rails 6 and 7. The rails 6 and 7 are fastened to the rail mounting members 4 and 5 with fastening members such as bolts. Two reference surfaces 4*b* and 4*c* against which the rails 6 and 7 abut are formed on the rail mounting members 4 and 5 (refer to FIG. 3). The rails 6 and 7 are fastened to the rail mounting members 4 and 5 with the rails 6 and 7 abutting against the reference surfaces 4*b* and 4*c* of the rail mounting members 4 and 5.

Figure 2:
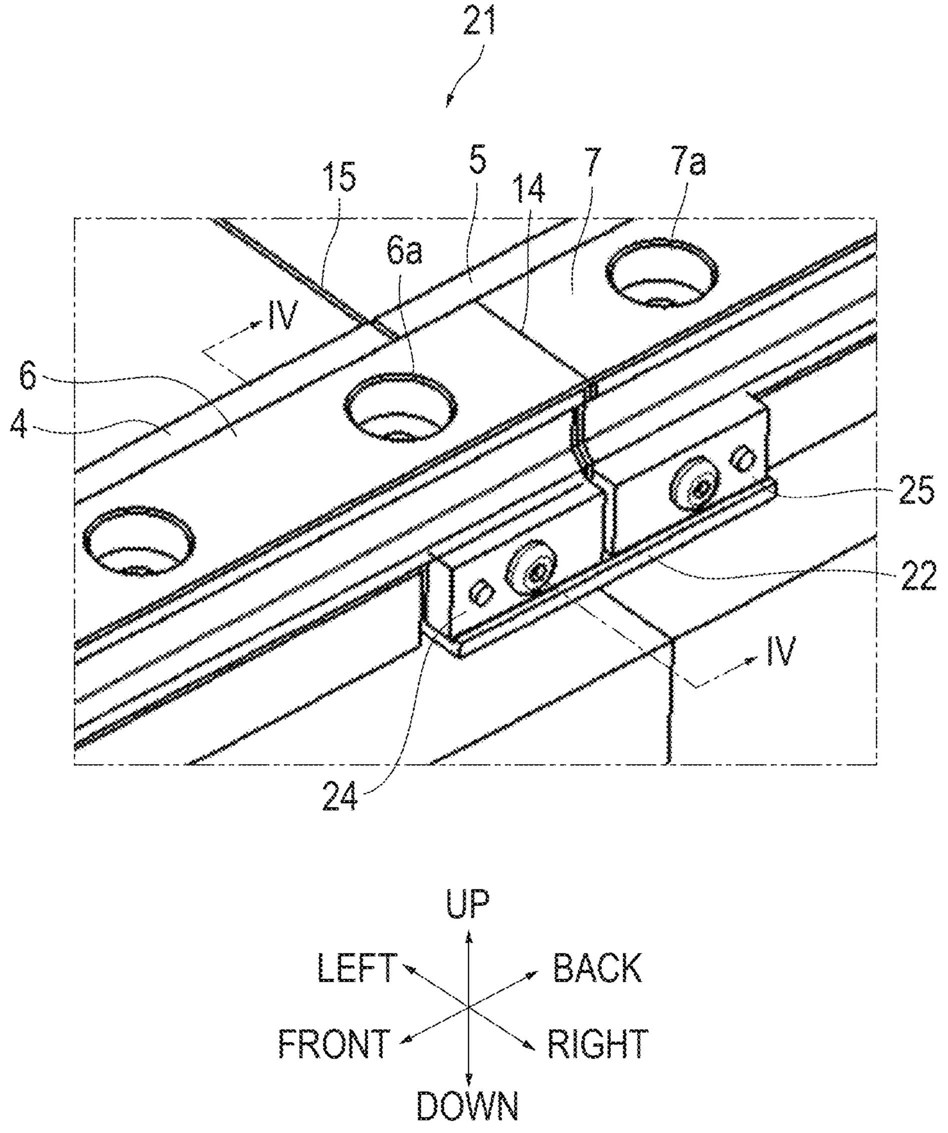
FIG. 2 is an enlarged view of the rail connecting structure of the present embodiment.
Figure 3:
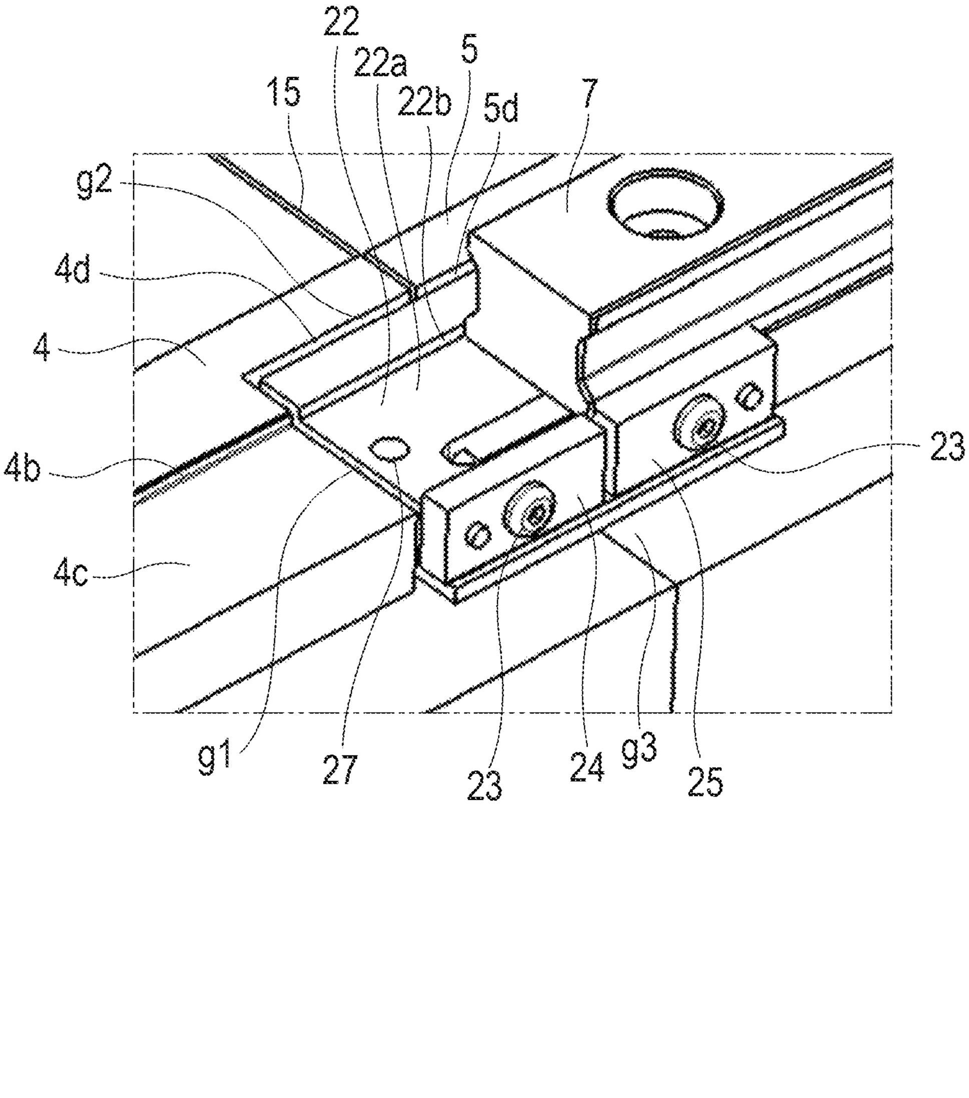
FIG. 3 is an enlarged view of the rail connecting structure of the present embodiment (with one rail removed).

FIGS. 2 and 3 illustrate enlarged views of the rail connecting structure 21 of the present embodiment. FIG. 3 illustrates a state in which one rail 6 has been removed. The reference signs 4 and 5 denote the rail mounting members, the reference signs 6 and 7 denote the rails, and a reference sign 22 denotes a base block.

The base block 22 is placed at the connecting portion 14 of the rail 6 and the rail 7. The rail mounting members 4 and 5 are formed with notches 4*d* and 5*d* for placing the base block 22 therein. The rails 6 and 7 are fastened to the base block 22 with fastening members such as bolts. A top surface 22*a* of the base block 22 is formed with female threads 27 that are threadedly engaged with the fastening members, at positions corresponding to the mounting holes 6*a* and 7*a* at ends of the rails 6 and 7. The base block 22 is formed with a reference surface 22*b* against which side surfaces of the rails 6 and 7 abut. The rails 6 and 7 are fastened to the base block 22 with the side surfaces of the rails 6 and 7 abutting against the reference surface 22*b*. Note that although the fastening members are omitted in FIGS. 2 and 3, there actually are the fastening members.

The base block 22 is separate from the rail mounting members 4 and 5. There are gaps g1 to g3 (the gap g1 in a front-and-back direction, the gap g2 in a left-and-right direction, and the gap g3 in an up-and-down direction (refer to FIG. 4)) between the base block 22 and the rail mounting members 4 and 5. The base block 22 is held only by the rails 6 and 7, and is not fixed to the rail mounting members 4 and 5. The base block 22 can move in the front-and-back, left-and-right, and up-and-down directions relative to the rail mounting members 4 and 5. Note that it is simply required that at least one of the gaps g1 to g3 is present. For example, the gap g3 in the up-and-down direction (refer to FIG. 4) may be substantially eliminated to receive the loads of the rails 6 and 7. Moreover, an interposed object such as rubber that allows movement of the base block 22 may be interposed in at least one of the gaps g1 to g3 to dampen vibrations of the rails 6 and 7.

Figure 4:
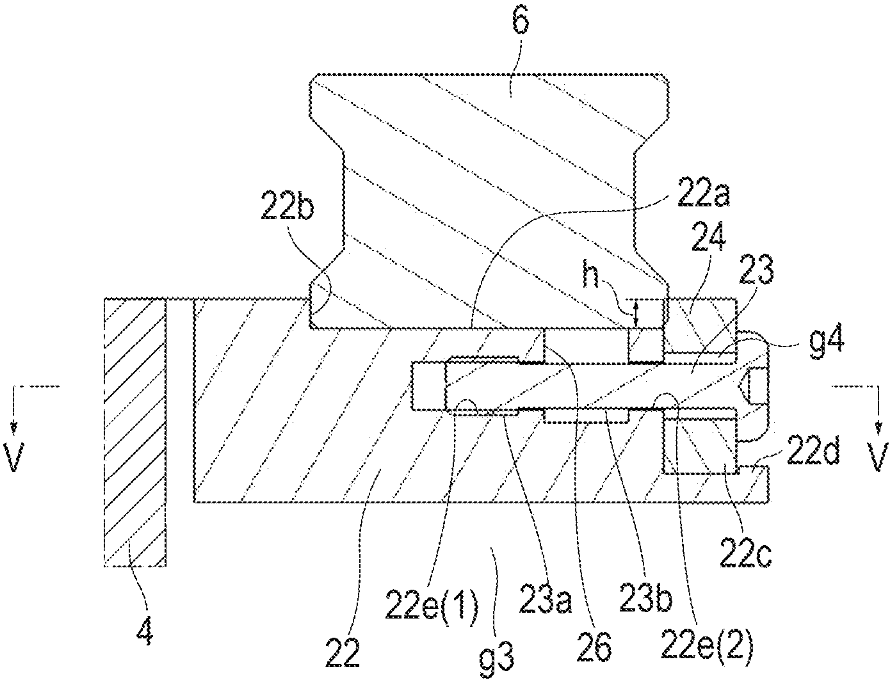
FIG. 4 is a cross-sectional view taken along line IV-IV of FIG. 2.
Figure 5:
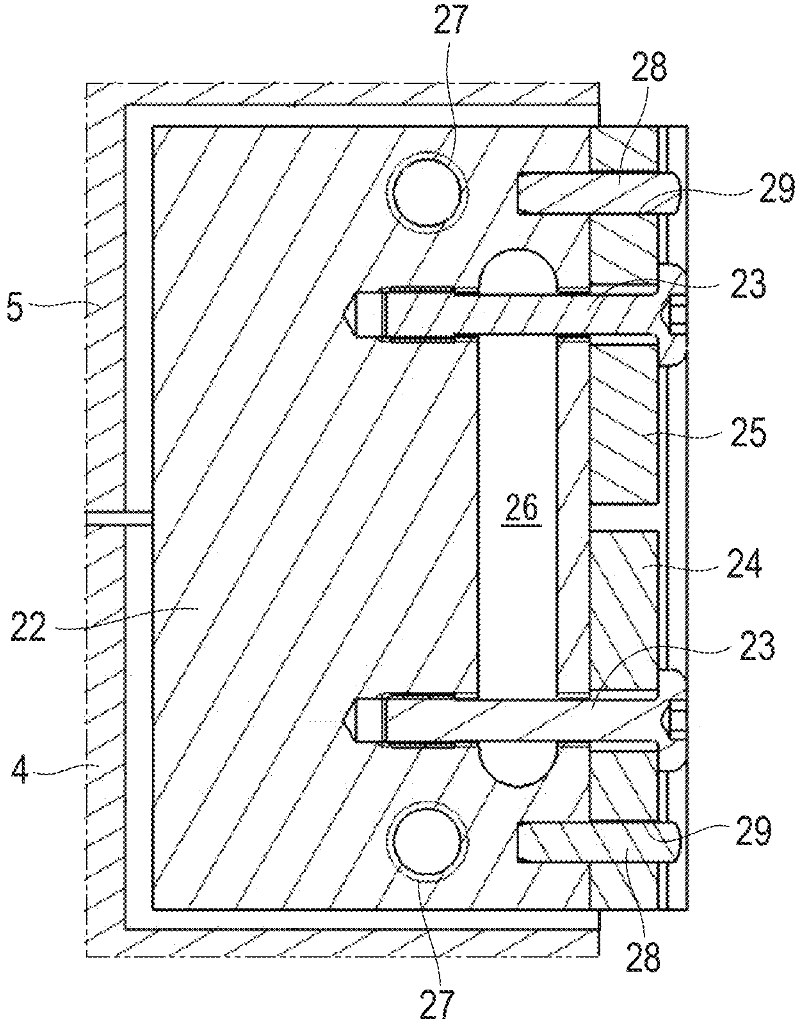
FIG. 5 is a cross-sectional view taken along line V-V of FIG. 4.

FIG. 4 illustrates a cross-sectional view taken along line IV-IV of FIG. 2, and FIG. 5 illustrates a cross-sectional view taken along line V-V of FIG. 4. In the present embodiment, the side surface of the rail 6 is pressed against the reference surface 22*b* of the base block 22 by use of a cap screw 23 that is threadedly engaged with the base block 22, and a rail retainer 24. The rail retainer 24 is placed on the side surface of the rail 6 opposite to the reference surface 22*b*. As illustrated in FIG. 2, the rail retainer 24 and a rail retainer 25 include a first rail retainer 24 placed on the side surface of the rail 6 and a second rail retainer 25 placed on the side surface of the rail 7.

As illustrated in FIG. 4, the base block 22 is formed with a female thread portion 22*e* that is threadedly engaged with the cap screw 23. The head of the cap screw 23 engages with the rail retainer 24. The side surface of the rail 6 can be pressed against the reference surface 22*b* by turning the cap screw 23.

The shank of the cap screw 23 has a threaded portion 23*a* on the tip side and an unthreaded portion 23*b* on the head side. The female thread portion 22*e* of the base block 22 is formed with a fall prevention groove 26 having a greater width than the axial length of the threaded portion 23*a* in such a manner as to divide the female thread portion 22*e*.

As illustrated in FIG. 5, the base block 22 is provided with guide shafts 28 protruding therefrom by, for example, press fitting. The rail retainers 24 and 25 are each formed with a guide hole 29 into which each of the guide shafts 28 fits. Note that the guide shafts may be provided to the rail retainers 24 and 25, and the guide holes may be formed in the base block 22.

As illustrated in FIG. 4, the base block 22 is formed with a jutting out portion 22*c* that protrudes below the rail retainers 24 and 25. A step portion 22*d* protruding upward is formed at a distal end of the jutting out portion 22*c*.

(Assembly Method of Rail Connecting Structure)

An assembly method of the rail connecting structure 21 of the present embodiment is described. Firstly, the rail mounting members 4 and 5 are assembled without the rails 6 and 7. Next, the rails 6 and 7 are abutted against the reference surfaces 4*b* and 4*c* of the rail mounting members 4 and 5, and then the rails 6 and 7 are fastened to the rail mounting members 4 and 5.

Next, the base block 22 is inserted into the notches 4*d* and 5*d* of the rail mounting members 4 and 5. Next, the fastening members are passed through the mounting holes 6*a* and 7*a* at the ends of the rails 6 and 7, and the ends of the rails 6 and 7 are temporarily fastened to the base block 22 with the fastening members. Next, the rails 6 and 7 are pressed against the reference surface 22*b* of the base block 22 by use of the cap screws 23. At this point in time, the cap screws 23 are tightened with a prescribed torque. Lastly, the temporarily fastened rails 6 and 7 are finally fastened to the base block 22. At this point in time, the fastening members are tightened with a prescribed torque. As described above, the assembly of the rail connecting structure 21 is completed.

(Operations and Effects of Rail Connecting Structure)

The rail connecting structure of the present embodiment has the following operations and effects.

Figure 6:
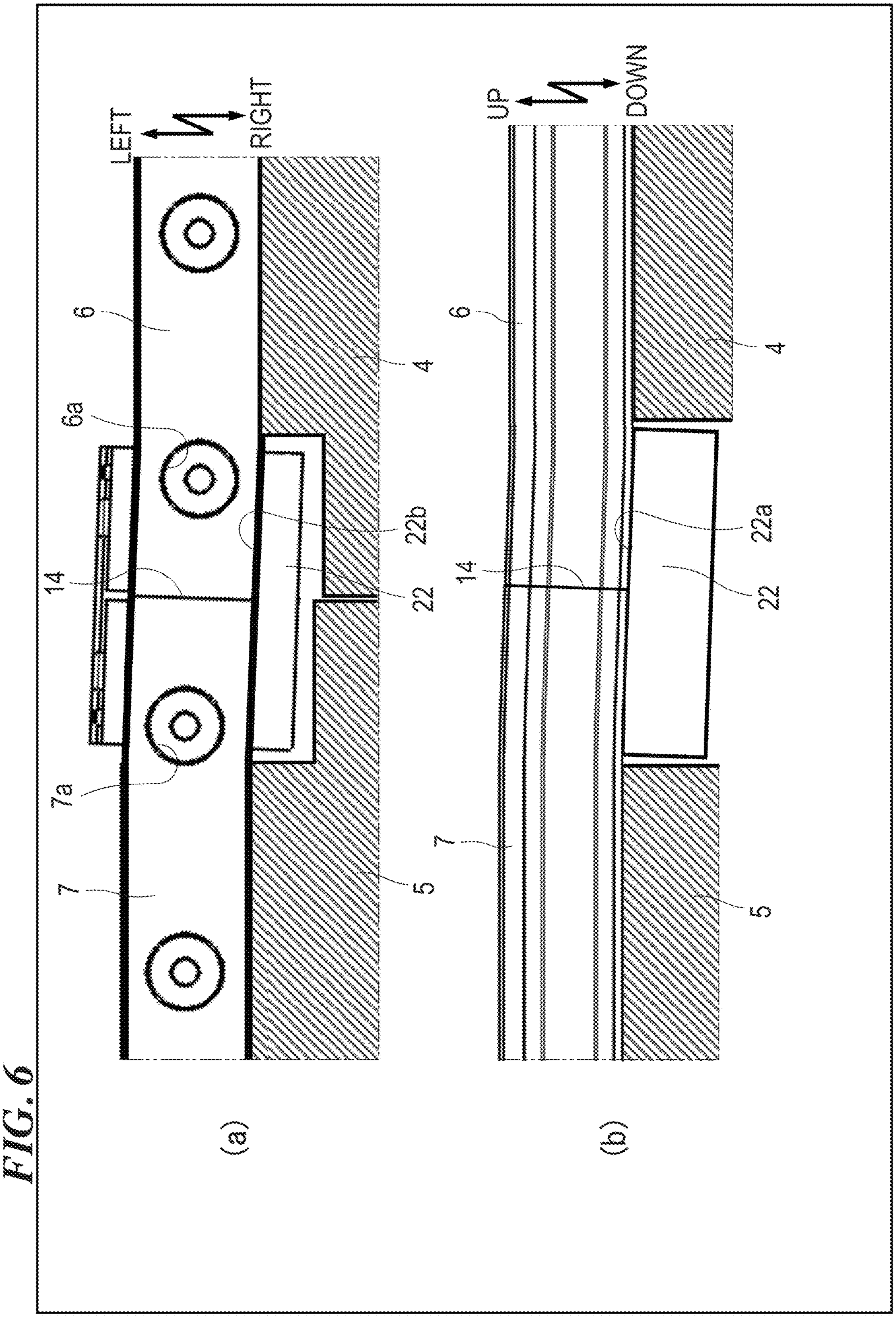
FIG. 6(*a*) is a plan view of the rail connecting structure of the present embodiment (with two rail mounting members misaligned laterally), and FIG. 6(*b*) is a side view of the rail connecting structure of the present embodiment (with the two rail mounting members misaligned vertically).

As illustrated in FIG. 6(*b*), the two rails 6 and 7 are placed on and fastened to the top surface 22*a* of the base block 22. Therefore, the two rails 6 and 7 undergo elastic deformation automatically, and positions thereof are aligned in the up-and-down direction. Hence, it is possible to reduce a level difference in the up-and-down direction at the connecting portion 14 of the rails 6 and 7. Moreover, as illustrated in FIG. 6(*a*), the two rails 6 and 7 are abutted against the reference surface 22*b* of the base block 22. Therefore, the two rails 6 and 7 undergo elastic deformation automatically, and the positions thereof are aligned in the left-and-right direction. Hence, it is possible to reduce a level difference in the left-and-right direction at the connecting portion 14 of the rails 6 and 7.

Even if the rail mounting members 4 and 5 are misaligned in the up-and-down direction as illustrated in FIG. 6(*b*), or even if the rail mounting members 4 and 5 are misaligned in the left-and-right direction as illustrated in FIG. 6(*a*), the base block 22 can move freely relative to the rail mounting members 4 and 5. Accordingly, the misalignment occurring on the rail mounting members 4 and 5 side can be absorbed.

There are the gaps g1 to g3 between the base block 22 and the rail mounting members 4 and 5, or an interposed object that allows the movement of the base block 22 is interposed between the base block 22 and the rail mounting members 4 and 5. Therefore, the base block 22 can be moved freely relative to the rail mounting members 4 and 5.

The side surfaces of the rails 6 and 7 are pressed against the reference surface 22*b* of the base block 22 by use of the cap screws 23 that are threadedly engaged with the base block 22. Therefore, a level difference in the left-and-right direction at the connecting portion 14 of the rails 6 and 7 can be further reduced.

The rails 6 and 7 are pressed against the reference surface 22*b* of the base block 22 by use of the cap screws 23 and the rail retainers 24 and 25. Therefore, as illustrated in FIG. 4, even if there is no margin for a mounting reference surface height h of the base block 22, the side surfaces of the rails 6 and 7 can be pressed against the reference surface 22*b* of the base block 22. Note that if the base block 22 has a sufficient mounting reference surface height h, the rail retainers 24 and 25 may be eliminated, and the rails 6 and 7 may be directly pressed with cap screws that are threadedly engaged with the mounting reference surface side.

The first rail retainer 24 and the second rail retainer 25 are provided. Therefore, even if there is a dimensional difference in the width direction between the two rails 6 and 7, the two rails 6 and 7 can be pressed against the reference surface 22*b* of the base block 22.

The fall prevention groove 26 is formed in such a manner as to divide the female thread portion 22*e* of the base block 22. Therefore, as illustrated in FIG. 4, even if the cap screw 23 comes out of a female thread portion 22*e* (1) of the base block 22, the cap screw 23 cannot be engaged with a female thread portion 22*e* (2) and go in. Hence, it is possible to prevent the cap screw 23 from falling out.

Figure 7:
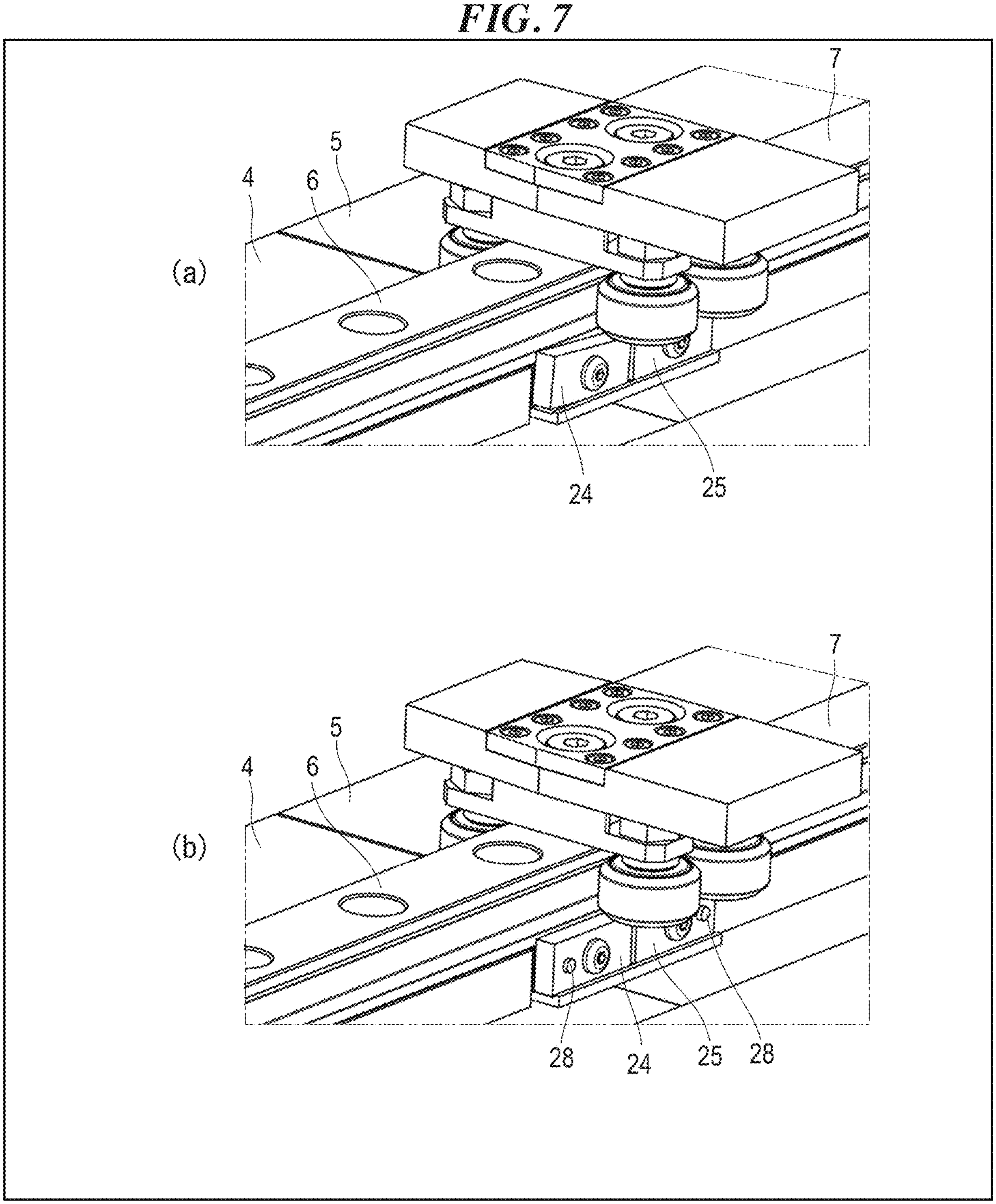
FIG. 7(*a*) illustrates a perspective view of a rail connecting structure of a comparative example in which guide shafts and guide holes are not provided, and FIG. 7(*b*) illustrates a perspective view of the rail connecting structure of the present embodiment.

FIG. 7(*a*) illustrates a comparative example in which the guide shafts 28 and the guide holes 29 are not provided, and FIG. 7(*b*) illustrates the present embodiment. The base block 22 is provided with the guide shafts 28, and the rail retainers 24 and 25 are formed with the guide holes 29 in which the guide shafts 28 fit. Therefore, it is possible to prevent the rail retainer 24 from moving in the up-and-down direction and rotating as illustrated in FIG. 7(*a*). Although the rail retainers 24 and 25 may move by a gap g4 (refer to FIG. 4) between the through-hole and the diameter of the cap screw 23, this can be prevented.

The base block 22 is formed with the step portion 22*d*. Therefore, the rail retainers 24 and 25 cannot move in the up-and-down direction beyond the step portion 22*d*. Hence, it is possible to prevent the rail retainers 24 and 25 from falling off.

The connecting portion 15 of the rail mounting members 4 and 5 and the connecting portion 14 of the rails 6 and 7 are at substantially the same position. Therefore, it is possible to prevent the rails 6 and 7 from coming out of the rail mounting members 4 and 5, and assemblability improves.

(Another Example of Linear Motor)

Figure 8:
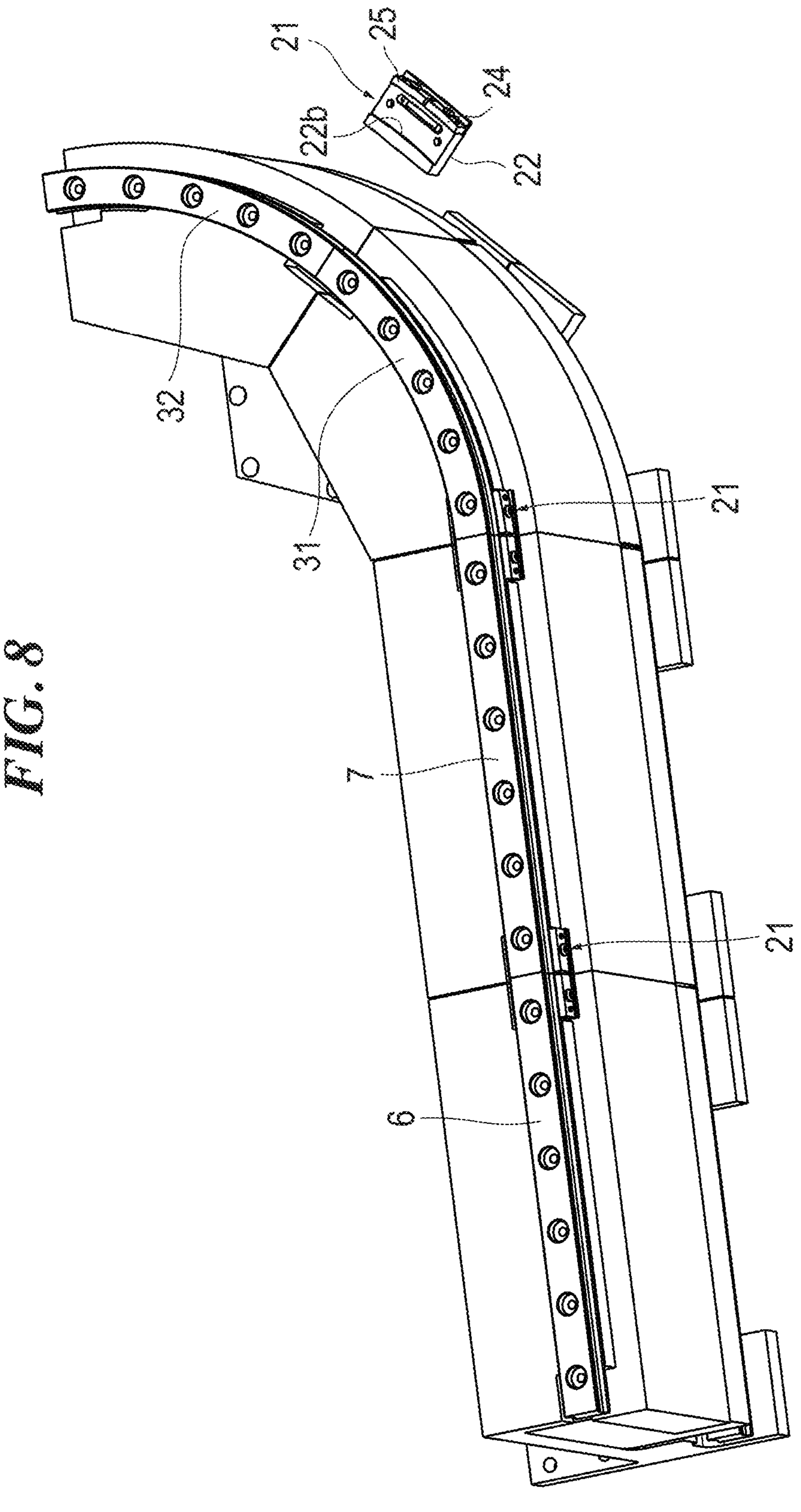
FIG. 8 is a perspective view of another example of a linear motor to which the rail connecting structure of the present embodiment is applied.

FIG. 8 illustrates another example of a linear motor to which the rail connecting structure 21 of the present embodiment is applied. The linear motor of this example includes not only the straight rails 6 and 7 but also curved rails 31 and 32. The rail connecting structure 21 of the present embodiment can be applied not only to the connection of the straight rail 6 and the straight rail 7, but also to the connection of the straight rail 7 and the curved rail 31 and of the curved rail 31 and the curved rail 32. In this case, the reference surface 22*b* of the base block 22 is formed in a curved shape that is adjusted to the shape of side surfaces of the rails 31 and 32. The rail retainers 24 and 25 are also formed in a curved shape that is adjusted to the shape of the side surfaces of the rails 31 and 32.

Note that the present invention is not limited to being embodied in the above-described embodiment, and can be embodied in other embodiments to the extent that the gist of the present invention is not changed.

For example, in the above embodiment, the example in which the rail connecting structure of the present invention is applied to the linear motor is described. However, the application of the rail connecting structure of the present invention is not limited to linear motors. The rail connecting structure of the present invention can be applied to various apparatuses such as a machine tool, semiconductor manufacturing equipment, and display panel manufacturing equipment in which a carriage and a moving block move along a rail mounted on a rail mounting member.

In the above embodiment, the rail mounting members are separated. However, the rail mounting members may be one integrated component.

The present description is based on Japanese Patent Application No. 2022-020928 filed on Feb. 15, 2022. The entire contents thereof are included herein.

REFERENCE SIGNS LIST

4, 5 Rail mounting member
6, 7 Rail
6*a*, 7*a* Mounting hole of rail
14 Connecting portion of rails
15 Connecting portion of rail mounting members
21 Rail connecting structure
22 Base block
22*b* Reference surface of base block
22*e* Female thread of base block
23 Cap screw
23*a* Threaded portion of cap screw
23*b* Unthreaded portion of cap screw
24 First rail retainer (rail retainer)
25 Second rail retainer (rail retainer)
26 Fall prevention groove of base block
28 Guide shaft
29 Guide hole
g1 to g3 Gap

The invention claimed is:

1. A rail connecting structure that connects rails to be mounted on rail mounting members, the rail connecting structure comprising:
- a base block that is placed at a connecting portion of one rail and the other rail and is separate from the rail mounting members, wherein
- the base block is fastened to the one rail and the other rail with fastening members that are passed through mounting holes of the one rail and the other rail,
- the base block is not fixed to the rail mounting members and is movable relative to the rail mounting members,
- the one rail is mounted on one rail mounting member,
- the other rail is mounted on the other rail mounting member,
- the one rail mounting member and the other rail mounting member are connected together, and
- the one rail mounting member and the other rail mounting member are each formed with a notch into which the base block is inserted.

2. The rail connecting structure according to claim 1, wherein there is a gap between the base block and the rail mounting members, or an interposed object that allows movement of the base block is interposed between the base block and the rail mounting members.

3. The rail connecting structure according to claim 2, wherein side surfaces of the rails are pressed against a reference surface of the base block by use of cap screws that are threadedly engaged with the base block.

4. A rail connecting structure that connects rails to be mounted on rail mounting members, the rail connecting structure comprising:
- a base block that is placed at a connecting portion of one rail and the other rail and is separate from the rail mounting members, wherein
- the base block is fastened to the one rail and the other rail with fastening members that are passed through mounting holes of the one rail and the other rail,
- the base block is not fixed to the rail mounting members and is movable relative to the rail mounting members,
- side surfaces of the rails are pressed against a reference surface of the base block by use of cap screws that are threadedly engaged with the base block,
- the base block is formed with female threads that are threadedly engaged with the fastening members, and
- the base block is formed with female thread portions that are threadedly engaged with the cap screws that are different from the fastening members.

5. The rail connecting structure according to claim 4, wherein
- the one rail is mounted on one rail mounting member, and
- the other rail is mounted on the other rail mounting member.

6. A rail connecting structure that connects rails to be mounted on rail mounting members, the rail connecting structure comprising:
- a base block that is placed at a connecting portion of one rail and the other rail and is separate from the rail mounting members, wherein
- the base block is fastened to the one rail and the other rail with fastening members that are passed through mounting holes of the one rail and the other rail, and
- the base block is not fixed to the rail mounting members and is movable relative to the rail mounting members,
- side surfaces of the rails are pressed against a reference surface of the base block by use of cap screws that are threadedly engaged with the base block and rail retainers placed on the side surfaces of the rails opposite to the reference surface.

7. The rail connecting structure according to claim 6, wherein
- a shank of each of the cap screws has a threaded portion on a tip side thereof and an unthreaded portion on a head side thereof, and
- the female thread portions of the base block are each formed with a fall prevention groove having a greater width than an axial length of the threaded portion in such a manner as to divide the female threaded portion.

8. The rail connecting structure according to claim 7, wherein
- the one rail is mounted on one rail mounting member, and
- the other rail is mounted on the other rail mounting member.

9. The rail connecting structure according to claim 6, wherein
- the one rail is mounted on one rail mounting member, and
- the other rail is mounted on the other rail mounting member.

10. The rail connecting structure according to claim 6, wherein
- a shank of each of the cap screws has a threaded portion on a tip side thereof and an unthreaded portion on a head side thereof, and
- the female thread portions of the base block are each formed with a fall prevention groove having a greater width than an axial length of the threaded portion in such a manner as to divide the female threaded portion.

11. The rail connecting structure according to claim 10, wherein
- the one rail is mounted on one rail mounting member, and
- the other rail is mounted on the other rail mounting member.

* * * * *